United States Patent [19]

Holt

[11] 4,244,008

[45] Jan. 6, 1981

[54] READ BACK COMPENSATION CIRCUIT FOR A MAGNETIC RECORDING DEVICE

[75] Inventor: Dewilton R. Holt, El Toro, Calif.

[73] Assignee: Siemens Corporation, Iselin, N.J.

[21] Appl. No.: 61,849

[22] Filed: Jul. 30, 1979

[51] Int. Cl.³ ............................................... G11B 5/09
[52] U.S. Cl. ........................................ 360/45; 360/65; 360/67
[58] Field of Search .............................. 360/45, 65, 67

[56] References Cited

U.S. PATENT DOCUMENTS

| | | | |
|---|---|---|---|
| 2,901,737 | 8/1959 | Stouall, Jr. ............................. | 360/67 |
| 3,405,403 | 10/1968 | Jacoby et al. ......................... | 360/45 |
| 3,436,490 | 4/1969 | Roelots ................................. | 360/65 |
| 3,465,321 | 9/1969 | Reisfeld ................................ | 360/65 |
| 3,516,066 | 6/1970 | Jacoby ................................. | 360/40 |
| 3,568,174 | 3/1971 | Jacoby et al. ......................... | 360/45 |
| 3,597,751 | 8/1971 | Heidecker et al. ..................... | 360/43 |
| 3,996,614 | 12/1976 | Budejicky ............................. | 360/45 |

OTHER PUBLICATIONS

"OEM—Floppy Disk Drive FDD 100-8"—Siemens Corp, OEM Division, Anaheim, Calif.
"OEM—Floppy Disk Drive FDD 200-8"—Siemens Corp, OEM Division, Anaheim, Calif.
"A Method of High Density Recording on Flexible Magnetic Discs" Franchini et al., Computer Design—Oct. 1976.
"Magnetic Recording"—C. E. Lowman—McGraw, Hill Book Co.
Switchable Gain Read Amplifier—Sensenbaugh et al., Vol. 18 #9 2/76, IBM Tech. Dis. Bul.

*Primary Examiner*—Vincent P. Canney
*Attorney, Agent, or Firm*—Spellman, Joel & Pelton

[57] ABSTRACT

In magnetic recording devices, such as floppy disk drives, operational difficulties in the faithful reproduction of recorded data include peak shifting. The invention overcomes these difficulties by introducing a read back compensation circuit comprising a frequency equalizer which favorably amplifies a certain harmonic of the original read signal. In a recording device using a modified frequency modulation encoding scheme (MFM), for instance, this harmonic would be the second harmonic. In order to minimize the effect of circuit paramater variations the frequency equalizer may be split between two circuits, specifically between the read filter network and the read differentiating network. First switching means connected to the filter network and second switching means connected to the differentiating network are arranged as to change the damping factor and the frequency of the filter and differentiating network. The switching means are controlled in dependence either of the speed of the recording medium or of a track signal indicating the position of the read head.

10 Claims, 2 Drawing Figures

READ BACK COMPENSATION CIRCUIT FOR A MAGNETIC RECORDING DEVICE

BACKGROUND OF THE INVENTION

1. Field of the Invention

This invention relates to a magnetic recording device and particularly to a device for the recovery of recorded data from a magnetic recording medium having a relative movement with respect to a sensing transducer. This invention relates more particularly to a novel and improved read back compensation circuit for a magnetic recording device such as a floppy disk drive.

2. Description of the Prior Art

Magnetic recording devices capable of storing digital data, especially binary data, are used with electronic data processing systems, communications systems, and the like. To improve the performance capability of such magnetic recording devices, there has been continuing effort to improve the recording density of such devices. That is, the number of bits or digits of digital data recordable on an inch of the magnetic recording medium is desired to be as large as possible. There has also been continuing effort in the faithful reproduction of the recorded digital data. Playback or readback of a magnetic recording is usually accomplished by amplifying the small amplitude signals induced in a magnetic reproducing or read head as the magnetic medium moves past the latter. Operational difficulties relating to faithfully reproducing the recorded data increase as the reading speed increases.

On the magnetic medium the digital data are represented either as changes in magnetic flux, as the polarity of magnetic flux, or as different frequencies of changing magnetic flux in a given area of the medium, which is often referred to as a "bit cell" or "cell." For example, a positive magnetic remanence may represent a binary "1", while a negative magnetic remanence may represent a binary "0". Or, for example, in a frequency modulation or bifrequency recording, a binary "0" may be represented by a first frequency of flux reversals, and a binary "1" may be represented by a second frequency of flux reversals. That is, for instance, a magnetic flux waveform having an "F" signal frequency may represent a binary "0", whereas a magnetic waveform having a 2F signal frequency may represent a binary "1". Frequency modulation is often used in floppy disk drives, where either a single-density frequency modulation encoding scheme (FM) or a double-density encoding scheme (MFM) is applied, see article "A Method of High Density Recording on Flexible Magnetic Discs" in the magazine "Computer Design", October 1976, pages 106 to 109.

A floppy disk drive is a random access storage device which uses a removable "floppy disk" as the storage medium. A single disk will presently store approximatley 3 to 6 megabits of data. The "floppy disk " is a magnetic-oxide-coated disk of some flexible material. It is usually sealed within a plastic envelope for protection, thus forming a disk cartridge. The disk cartridge should be handled and stored in an environment which is free from magnetic influences.

In floppy disk drives as well as in other magnetic recording devices, operational difficulties in the faithful reproduction of recorded digital signals include so-called peak shifting. Peak shifting is a term applied to the readback signal, which indicates a shift of recording cell boundaries; peak shift also looks like a longer duration recorded pulse or signal than was acutally recorded (see for instance U.S. Pat. No. 3,597,751).

In other words: For alternate "1's" and "0's" there should be a sharp demarcation between adjacent recorded areas on the recording medium. This should also be true for groups of "1" cells alternating with one or more "0" cells. However, a comparison between the recording signal and the readback signal reveals that the two boundaries next to a "0" cell tend to be shifted towards the center of the "0" cell. They seem to "wander" into the center of the "0" cell. At high recording densities peak shifting can cause errors in the processed read signal.

Peak shifting is characteristic of all magnetic disks and tapes, including single-density flexible disks, but can be more serious with modified frequency modulation (MFM) and modified-modified frequency modulation ($M^2FM$), see "Computer Design", supra.

Two methods are known to compensate for peak shifting. One of them influences the writing operation, where a write signal, consisting of electrical pulses and gaps, is applied to the write head. This method makes use of shifting those pulses, which are located adjacent to a gap, away from this gap ("pre-write compensation method"). The other compensation method influences the reading operation. It makes use of re-shifting read signal peaks, which are located adjacent to a gap, to their proper position ("post-read compensation method").

A read back circuit for a magnetic recording device is known from the brochures "OEM, Floppy Disk Drive FDD 100-8" and "OEM, Floppy Disk Drive FDD 200-8" by Siemens Corporation, Anaheim, California. In FIGS. 3.31 and 3.32, respectively, there is disclosed a read back circuitry for a floppy disk drive. The read back circuitry comprises a write/read head which reads data from a floppy disk during read operation. The output terminals of the head are connected via a field effect transistor (FET) in each connection line to a high-gain linear amplifier. The FETs are actuated during the read operation mode to pass read data from the head to the preamplifier. The output of the preamplifier is connected to the input of a filter network, the output of which is connected to a differentiating network. The filter network is a 3-pole linear-phase bandpass filter comprising a series and parallel combination of capacitors, resistors and chokes, see FIGS. 3.32 and 3.33, respectively. The differentiating network comprises an amplifier and a resonance circuit which is connected to the amplifier and which has connected in series a capacitor, an inductor and a resistor, see FIGS. 3.33 and 3.34 respectively. The differentiating network provides a 90-degree delay to convert the incoming read data signal peaks to distorted zero crossings. Zero crossings are detected by a crossover detector, which is connected to the output of the differentiating network. The crossover detector is formed by a comparator and a bidirectional one-shot. The comparator is driven by the analog output of the differentiator and provides a data pulse for each zero crossing. The floppy disk drive also comprises a counter which determines whether the write/-read head is positioned on a track above or below a predetermined number. There is provided no read back compensates circuit which compensated for peak shifting.

It is known in magnetic recording that any recording device and in particulary any disk drive has a so-called "worst case" pattern for peak shifting. For a double-sensity encoding scheme (MFM) in a floppy disk drive, for instance, the "worst case" pattern would be 0, 1, 1, 0, 1, 1, 0, 1, 1, 0, etc. (so-called 6DB6 pattern). An investigation of this pattern by a spectrum analyzer indicates that apart from the fundamental the pattern contains a second harmonic. Other "worst case" patterns reveal different harmonics. It is also well-known that, in order to push the shifted peaks back to their proper position, a certain harmonic should be added to the original signal. Such a read back compensation circuit is based on the post-read method.

In the field of magnetic recording it is also known to use Equalizers in the recording and/or reproducing operation, see for instance "Magnetic Recording" by Charles E. Lowman, McGraw Hill Book Co., New York, pages 86 to 89 and 147 to 149.

SUMMARY OF THE INVENTION

1. Objects

An object of this invention is to provide a read back compensation circuit for a magnetic recording device that compensates for peak shifting during read operation not by adding a certain harmonic, but by amplifying the correct harmonic of the original signal.

Another object of the present invention is to provide a read back compensation circuit for a magnetic recording device that is simple in structure.

A further object of the present invention is to provide a read back compensation circuit for a magnetic recording device that is actuated only at high recording densities and/or high data reading speed.

Still a further object of the present invention is to provide an improved compensation circuit for correcting the peak shift in worst case read/write patterns of a floppy disk drive, particularly of a floppy disk drive having a read back circuitry comprising a filter network and a differentiating network.

Still a further object of the present invention is to provide a read back compensation circuit for a magnetic recording device which has sufficient damping factor and is nevertheless widely insensitive to variations of its components.

Still a further object of the present invention is to provide a read back compensation circuit which, compared to well-known read back circuits, requires only few additional components.

Still a further object of the present invention is to provide a read back compensation circuit for the floppy disk drive described in the Siemens Corporation brochures "OEM, Floppy Disk Drive FDD 100-8" and "OEM, Floppy Disk Drive FDD 200-8", supra.

2. Summary

According to one aspect of this invention, in a read back circuit there is provided a Frequency Equalizer for pushing the shifted peaks back to their proper position. Such a Frequency Equalizer is characterized by amplifying the "correct" harmonic of the original read signal. In the above-mentioned case of a double-density encoding scheme (MFM), for instance, the second harmonic would be the "correct" harmonic and would be amplified by the Frequency Equalizer. Particularly, such a Frequency Equalizer can be used to compensate for peak shifting during read operation of a floppy disk drive.

The Frequency Equalizer may comprise an amplifier and a filter circuit, which are designed to amplify and to pass essentially the correct harmonic. However, the amplification by a Frequency Equalizer is often difficult because the normal component variation of the Frequency Equalizer creates an incorrect wave shape for patterns other than that considered worst case. Also, the damping factor and natural frequency of a Frequency Equalizer is non-linear, especially when the damping factor is below 0.4. Therefore, according to another aspect of the invention and in order to minimize the effect of circuit parameter variations on the Frequency Equalizer in the read circuit, said Frequency Equalizer-as far as its components are considered-is split between two circuits. In a floppy disk drive of the known type (Siemens Corp. brochures, supra) this can be done specifically between the read filter network and the read differentiating network.

According to another aspect of this invention, there may be provided means for actuating the Frequency Equalizer when the recording density on the magnetic medium is above a predetermined value, and for deactuating the Frequency Equalizer when the recording density equals or is below this value. Switches, especially eletronic switches like transistors, may serve as actuating means. In a case where the Frequency Equalizer comprises two circuits of non-linear frequency characteristics, components of these two circuits determining the damping factor and the output/input relation of the correct frequency should be switched in and out simultaneously.

According to another aspect of the invention, in case of a floppy disk drive, switching should be performed as function of track location. The selection of the proper track can be a result of a consideration of the current saturation curve of the magnetic medium.

BRIEF DESCRIPTION OF THE DRAWINGS

The foregoing and other objects, features and advantages of the invention will be apparent from the following more particular description of preferred embodiments of the invention, as illustrated in the accompanying drawings.

In the drawings.

Similar elements are referred to by the same numerals throughout the drawings.

DESCRIPTION OF THE PREFERRED EMBODIMENTS

Figure 1:
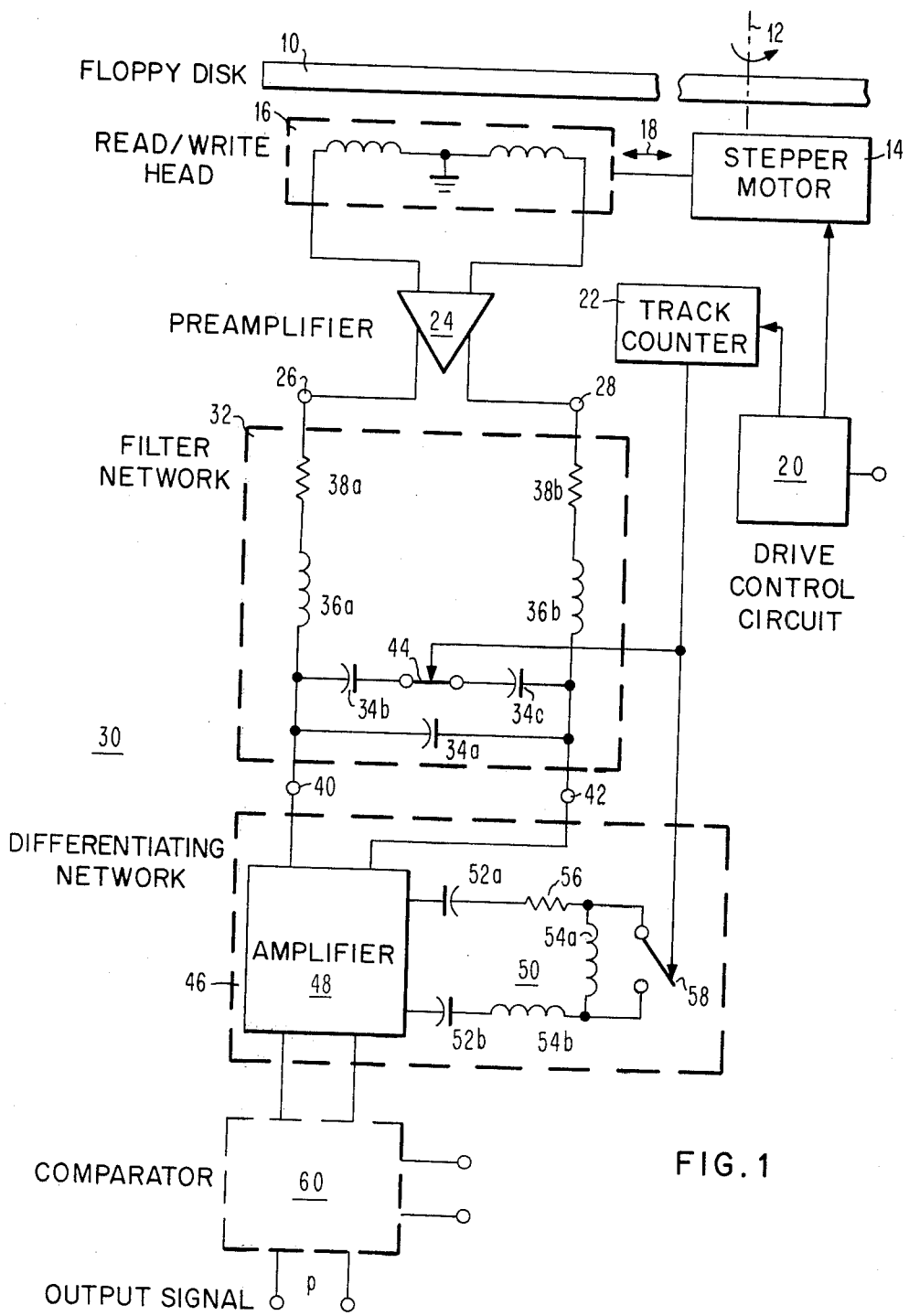
FIG. 1 is a first read back compensation circuit for a floppy disk drive, in accordance with this invention.

With reference to FIG. 1, a magnetic storage device, in particular a floppy disk drive, uses a floppy disk 10 as a magnetic storage medium. For data storage and accessing the disk 10 is divided into a certain number of adjacent tracks, for instance into 77 tracks, which are identified by numerals 00 to 76. The outmost track shall have the numeral 00, and the innermost track shall have the numeral 76. The floppy disk 10 will store, for example, up to 6.4 megabits of double-density unformatted or 3.2 megabits of single-density data. It is assumed that a modified frequency modulation encoding scheme (MFM) is applied.

During operation of the floppy disk drive, the floppy disk 10 is rotated around an axis 12 by an electric motor (not shown). The rotation speed is kept constant and, for instance, could amount to 360 revolutions per minute.

A stepper motor 14 positions a read/write head 16 on a track to be accessed. Positioning is performed in the direction of a double arrow 18, i.e. perpendicular to the axis 12. During a write operation, write data is input to write circuits (not shown). For each write data pulse received from a controller (not shown), a flux reversal is recorded on the disk 10 by the read/write head 16. During a read operation, each recorded flux reversal is sensed by the read/write head 16 as a reading signal converted by processing circuitry into a "raw data pulse" (see output signal p) and supplied to the controller (not shown). The controller controls loading of the read/write head 16 to the disk 10, track addressing and read/write data transfers between the disk 10 and the head 16. A part of the controller, which controls the stepper motor 14 and performs track addressing, is shown as drive control circuit 20.

The control circuit 20 also drives a track counter 22 which detects the position of the read/write head 16 on a track exceeding a perdetermined track numeral. In the example mentioned above, the predetermined track could be, for instance, track 60. The proper track numeral to be selected depends on the saturation curve of disk 10. When the head 16 reaches the preselected track, the output signal of the track counter 22 changes. It is, for instance, an H-signal as long as head 16 is located on one of the tracks 00 to 60 (first group of tracks), and it is an L-signal as soon as the head 16 passes over track 60 and is located on one of the tracks 61 to 76 (second group of tracks).

The output of the read/write head 16 is connected to the input of a linear preamplifier 24 of a relatively high gain. The gain could be, for instance, 100. The output of the preamplifier 24 is connected to the inputs 26, 28 or a processing circuitry of read back circuit 30 which comprises compensation means to compensate for peak shifting during read operation.

The amplified reading signal is supplied to a filter network 32, which is illustrated in the embodiment of FIG. 1 as a low pass filter. The filter network 32 comprises first capacitance devices 34a, 34b, 34c, first inductance devices 36a, 36b and first resistance devices 38a, 38b. The outputs are designated as 40 and 42.

In more detail, a resistance 38a and an inductanace 36a are connected in series relationship between input 26 and output 40, and a resistance 38b and an inductance 36b are connected in series relationship between input 28 and output 42; a capacitance 34a is connected between the outputs 40 and 42; and a series connection of a capacitance 34b, of a first switch 44 and of a capacitance 34c is connected parallel to capacitance 34a. The arrangement of the components of the filter network 32 is preferably symmetrical. Therefore, capacitances 34b, 34c and inductances 36a, 36b and resistances 38a, 38b have each the same values, respectively. Switching of the first switch 44 provides for changing of the effective capacity of the filter network 32 and thus for changes of its damping factor and frequency.

To the outputs 40, 42 there is connected a differentiating network 46. The network 46 comprises an amplifier 48 and a filter, referred to as 50. Filter 50 is a series connection of second capacitance devices 52a, 52b, second inductance devices 54a, 54b and a second resistance device 56. A second switch 58 is connected in paralled to the inductance 54a. Switching of the switch 58 provides for changing of the effective inductivity of the amplifier filter 50 and thus for changes of the damping factor and frequency of the differentiating network 46.

The output of the differentiating network 46 is connected to a comparator 60. The output signal of comparator 60 is referred to as output signal p. The comparator 60 is a crossover detector to detect the zero crossings in the output signal of the differentiating network 46. It may also comprise a one-shot to provide for a pulse train according to the output signal of the crossover detector.

Assume that upon a track signal from track counter 22 first switch 44 is closed and second switch 58 is opened, and switches 44 and 58 take the positions shown in FIG. 1. Then the effective capacity of the filter network 32 and the effective inductivity of the differentiating network 46 are raised. In the filter network 32 the resonance frequency is decreased, the filter curve is frequency-shifted, and the damping factor becomes smaller. In the differentiating network 46 the resonance frequency is decreased, the differentiating characteristic is frequency-shifted, and the damping factor is decreased. Thus, upon switching both damping factors and both frequencies became smaller at the same time. A smaller damping factor and lower frequency fulfill the requirement to make a certain harmonic of the read signal, for instance, the second harmonic stronger. In the embodiment shown in FIG. 1 this requirement is fulfilled at higher data recording speed, i.e., when data are read from one of the tracks 60 to 76, for example. Thus, the elements 34b, 34c, 44 and 54a, 58 form a Frequency Equalizer.

If, however, the switches 44 and 58 are switched to their second positions (not shown in FIG. 1), both damping factors and frequency responses increase. That is, the damping factor of the complete read circuitry will increase. This second position of both switches 44, 58 is used at lower data recording speeds, i.e., at track positions 00 to 59, where compensation for peak shift is not necessary.

The switching of capacitances 34b, 34c and of inductance 54a shall now be considered from another point of view.

As already mentioned earlier, the requirement for compensation of peak shifting is to make a certain or "correct" harmonic stronger, for instance, the second harmonic, relative to the fundamental. On the one hand, this could be achieved simply by making the damping factor smaller in the filter network 32 per se. Then, however, a small variation in the values of the electrical components of the filter network 32 would cause a great change of gain. For instance, a decrease of the damping factor from 0.25 to 0.20 would cause much more gain than a decrease from 0.55 to 0.50. This could cause problems with the control. If the damping factor is not small enough, however, sufficient gain, which is required in the harmonic, could not be achieved. On the other hand, in order to make a certain harmonic stronger, the damping factor of the differentiating network 46 per se could be made smaller. This, however, would cause the same problems as just mentioned.

To overcome these difficulties which arise from the variation of components, increase of the "correct" harmonic has been split between two circuits: a first part of the required gain is achieved from the filter network 32, and a second part is achieved from the differentiating network 46.

Generally speaking, as the result of the switching of the switches 44, 58 the frequency response of both filters 32, 50 is changed. With the switches 44, 58 in both filters 32, 50, the damping factor of the read circuit 30 can be decreased, making the operation of the read circuit 30 less sensitive to variations in the values of the used components (resistors, coils, condensors) compared to a case where a change takes place only in one of both circuits.

Figure 2:
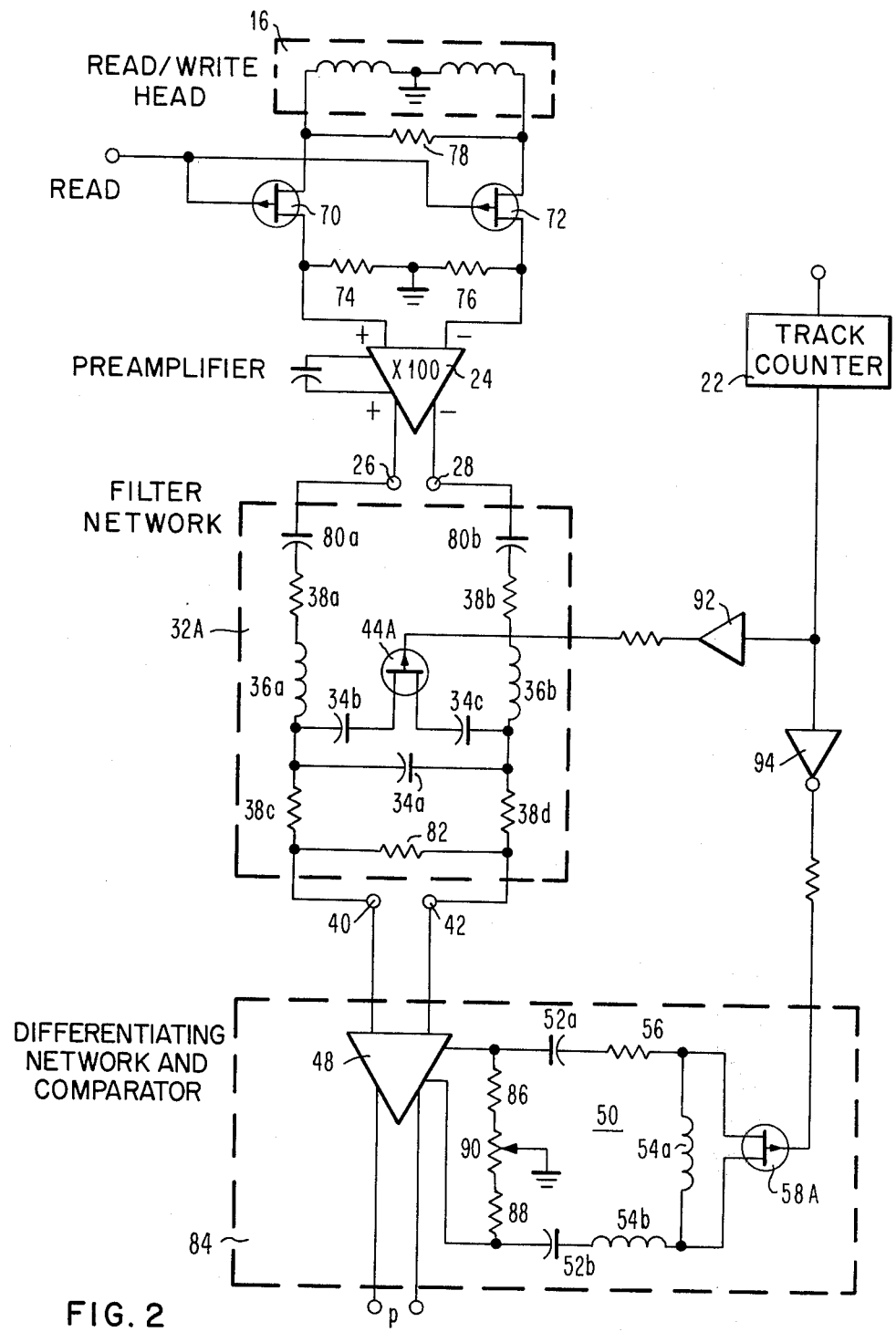
FIG. 2 is a second read back compensation circuit for a floppy disk drive, in accordance with this invention.

Turning now to FIG. 2, there is illustrated a second embodiment of a read back compensation circuit which is similar to the circuit of FIG. 1. According to FIG. 2, the read/write head 16 is connected to the preamplifier 24 via FETs 70 and 72 in each connection line. When the disk drive is operating in the write mode, the gates of the FETs 70, 72 get an H-signal from the controller (not shown). Both FETs 70, 72 are then in the off state to isolate the head coil from the preamplifier 24. When the disk drive is operating in the read mode, the gates get a READ-signal (L-signal). Then both FETs are in the on state. Read damping is determined by three resistors 74, 76 and 78. Resistors 74, 76 are connected in series across the input of preamplifier 24. Their connection point is connected to ground. Resistor 78 is connected between the input drains of FETs 70 and 72.

Filter network 32A comprises two series connections of a condenser 80a and 80b, a resistor 38a and 38b, a choke 36a and 36b and a further resistor 38c and 38d, respectively. These series connections are arranged between the inputs 26, 28 and the outputs 40, 42, respectively. Two capacitances 34b and 34c are connected to the drains of a FET 44 A, which serves as a first switch; in parallel to this capacitance - FET combination there is connected a capacitance 34a. The arrangement of the components 34a, 34b, 34c, and 44A is connected between the two connection points of the choke 36a, 36b and the further resistor 38c, 38d, respectively. A resistor 82 is connected between the outputs 40, 42.

Of course, a different arrangement of the elements of the filter network 32A can be chosen. For instance, either the capacitance 34a or the series connection of the elements 34b, 34c, 44A could be connected in parallel to the output 40, 42 while the arrangement of the other components would remain unchanged.

According to FIG. 2, differentiating network 46 and comparator 60 of FIG. 1 are combined in a network 84. The amplifier 48 is an IC-circuit, and the filter 50 corresponds to the filter 50 of FIG. 1. A FET 58A, which is connected in parallel to inductance 54a, serves as a second switch. Resistors 86, 88 and potentiometer 90 provide a dc offset adjustment. The arm of potentiometer 90 is connected to ground.

The FETs 44A and 58A (first and second switches) are both controlled by the track signal of the track counter 22. The track signal is applied to the FET 44A via an amplifier 92 and to the FET 58A via an inversing amplifier 94. Track counter 22 again provides a first signal when the head 16 is positioned on a track having a number lower than a predetermined number, and a second signal when the number equals or is higher than the predetermined number.

The circuit of FIG. 2 operates in the same way as the circuit of FIG. 1: Track counter 22 causes the outputs of amplifiers 92 and 94 to change states at track 60. The new states stay between tracks 60 and 76. FET 44a is "on" between tracks 60 and 76. This connects the series connection of the condensors 34b, 34c in parallel with condensor 34a. This in turn increases the total capacitance of the filter network 32A, whereby both the frequency response and the damping of the filter network 32A is lowered. This in turn causes the second harmonic to be amplified. The amplification causes the data peaks to be pushed towards their proper position, thereby increasing the performance of the disk drive. -When FET 44A is switched "on", FET 58A is switched "off." This removes the short across the coil 54a. The inductance of coil 54b is added to the inductance of coil 54b. This gives the same result as closing FET 44a. Both FET 44A and 58A together improve the performance of the drive.

What is claimed is:

1. A read back compensation circuit for a magnetic recording device comprising:
   (a) a circuit input having applied thereto a reading signal from a read head, said read head being determined for reading data from a magnetic recording medium;
   (b) a filter network operationally connected to said circuit input, said filter network having a damping factor and a resonance frequency;
   (c) means for determining the data speed of the data in the reading signal relative to a predetermined value;
   (d) switching means connected to said filter network, said switching means being arranged as to change the damping factor and resonance frequency of said filter network and being controlled by said means for determining the data speed, thereby to increase a predetermined harmonic of said reading signal relative to the fundamental thereof and thereby to compensate for peak shifting when said data speed is above a predetermined value; and
   (e) a processing network connected to the output of the filter network for providing a data output signal.

2. A read back compensation circuit for a floppy disk drive comprising:
   (a) a circuit input having applied thereto a reading signal from a read head, said read head being determined for reading data from at least a first and a second group of adjacent tracks of a rotating floppy disk, said second group supplying a reading signal having a higher data speed than said first group;
   (b) a filter network connected to said circuit input, said filter network comprising first capacitance means and first inductance means and having a first damping factor and a first frequency response;
   (c) a differentiating network connected to said filter network, said differentiating network comprising second capacitance means and second inductance means and having a second damping factor and a second frequency response, said differentiating network providing an output signal when said read head is reading data from said floppy disk;
   (d) track counting means for delivering a first track signal when said read head is reading data from the first group of adjacent tracks of the floppy disk, and for delivering a second track signal when said read head is reading data from said second group of adjacent tracks;
   (e) first switching means being controlled by said track counting means and being arranged as to change the first damping factor and the first frequency response of said filter network, such as to increase a predetermined harmonic of said reading signal relative to the fundamental thereof when said track counting means delivers said second track signal, thereby compensating for peak shifting in said read signal when said read head is reading data from said second group of tracks; (f) a comparator network connected to said differentiating network for providing a data pulse for each zero crossing of the output signal of said differentiating network; and (g) a circuit output for picking up said data pulses as a data output signal.

3. Read back compensation circuit according to claim 2, further comprising a preamplifier, the input of which is determined to be connected to said read head and the output of which is connected to said circuit input.

4. Read back compensation circuit according to claim 2, wherein said filter network is a low pass filter.

5. Read back compensation circuit according to claim 2, wherein said filter network comprises a series connection of a first capacitor and a first choke, and wherein said first switching means is arranged to change the capacitance of said filter network.

6. Read back compensation circuit according to claim 2, wherein said filter network comprises a series connection of a first choke, a first capacitor and a second choke, wherein said first switching means is a switch, wherein said switch is connected in series to a second capacitor, and wherein the series connection of the switch and the second capacitor is connected in parallel to the first capacitor.

7. Read back compensation circuit according to claim 2, wherein said filter network comprises a series connection of a first choke, a first capacitor and a second choke, wherein said first switching means is a switch, wherein said switch is connected in series to a second and a third capacitor, and wherein the series connection of the second capacitor, the switch and the third capacitor is connected in parallel to the first capacitor.

8. Read back compensation circuit according to claim 2, wherein said differentiating network and said comparator network comprise an amplifier to which is connected a filter differentiator.

9. Read back compensation circuit according to claim 2, wherein said second switching means is controlled by said track counting means and is arranged as to change the second damping factor and the second frequency response of said differentiating network, such as to increase a predetermined harmonic of said reading signal relative to the fundamental thereof when said track counting means delivers said second track signal, thereby compensating for peak shifting in said read signal when said read head is reading data from said second group of tracks.

10. Read back compensation circuit according to claim 9, wherein said first and second switching means are transistors which are controlled by the track signal.

11. Read back compensation circuit according to claim 9, wherein the filter differentiator comprises the series connection of a condensor, a first and a second coil, wherein said second switching means is a switch which is connected in parallel to the second coil.

* * * * *